(12) United States Patent
Dion et al.

(10) Patent No.: US 6,805,150 B1
(45) Date of Patent: Oct. 19, 2004

(54) SUPPLY DEVICE FOR SNOW GUN

(75) Inventors: Jean-François Dion, Brains (FR); Pierrick Jouneau, Treillieres (FR)

(73) Assignee: York Neige, Saint Luce sur Loire (FR)

(*) Notice: Subject to any disclaimer, the term of this patent is extended or adjusted under 35 U.S.C. 154(b) by 258 days.

(21) Appl. No.: 10/018,883
(22) PCT Filed: Jun. 23, 2000
(86) PCT No.: PCT/FR00/01772
§ 371 (c)(1), (2), (4) Date: Apr. 12, 2002
(87) PCT Pub. No.: WO01/01054
PCT Pub. Date: Jan. 4, 2001

(30) Foreign Application Priority Data

Jun. 25, 1999 (FR) .......................................... 99 08438

(51) Int. Cl.[7] ................................................ F25C 3/04
(52) U.S. Cl. ........................... 137/269; 137/62; 137/79
(58) Field of Search ........................... 137/269, 62, 79, 137/625.68, 625.69, 625.25, 625.67

(56) References Cited

U.S. PATENT DOCUMENTS

| 4,004,610 | A | * | 1/1977 | Theriot ................... 137/614.17 |
| 4,256,141 | A | * | 3/1981 | Peters .................... 137/625.66 |
| 4,717,072 | A | * | 1/1988 | Girardin ...................... 137/62 |
| 5,031,832 | A | | 7/1991 | Ratnik et al. |
| 5,718,378 | A | | 2/1998 | Dupre |

FOREIGN PATENT DOCUMENTS

| DE | 42 43 731 | 5/1994 |
| DE | 44 02 821 | 5/1995 |
| EP | 0 648 964 | 4/1995 |

* cited by examiner

Primary Examiner—Kevin Lee
(74) Attorney, Agent, or Firm—Young & Thompson

(57) ABSTRACT

The invention concerns a device consisting of at least a valve comprising a body (1) with a through channel (5), provided with several orifices and in particular orifices (4) serving both as intake and/or through passage, which orifices (4) are provided to enable, by means of accessory components, two bodies to be juxtaposed, and provide a common supply to several valves. The communication between the intake channel (5) and the outlet port (9) is provided by means of a cylindrical bore and a slide valve mobile in said bore. The outlet port (9) is located above the channel (5) and a bleed orifice (16) is located beneath said channel. Said bleed orifice (16) is in communication with the outlet port by means of the slide valve.

10 Claims, 2 Drawing Sheets

SUPPLY DEVICE FOR SNOW GUN

CROSS REFERENCE TO RELATED APPLICATION

This is the 35 USC 371 national stage of International Application PCT/FR00/01772 filed on Jun. 23, 2000, which designated the United States of America.

FIELD OF THE INVENTION

This invention relates to a supply device for a snow gun.

This equipment is used under very particular and very severe conditions, notably from a climatic viewpoint.

BACKGROUND OF THE INVENTION

An example of equipment is described in the document FR-2 573 854. This document gives the detail of a snow making plant and in particular a supply device for a high pressure-type snow gun.

To take maximum advantage of the climatic conditions, it is conventional to use several high pressure-type snow guns, each having different, but complementary characteristics in terms of flow rate.

In such a case, each snow gun comprises its own supply device, of the a type described in the document mentioned above.

This type of supply device is not adequate for snow guns or spray devices any longer, of the type described in the document FR-2 784 905 which require several distinct pressurised water supplies or for any other types of snow gun that operate without resorting to any special pressurised water supply system.

SUMMARY OF THE INVENTION

This invention suggests a supply device that enables to meet the new requirements of snow guns.

This supply device comprises at least a valve for circulating either pressurised water or pressurised air, which valve contains, in a single piece body, for example:
  a through channel forming the fluid intake and also serving as a through passage for the said fluid,
  a fluid outlet port, situated above the said channel,
  a bleed orifice beneath the said channel,
  a cylindrical bore arranged according to an axis perpendicular to that of the said channel, to accommodate a slide valve that is mobile under the effect of a driving member, which slide valve is provided to, in one case, put the channel in communication with the said outlet port, and to, in another case, put the said outlet port in communication with the said bleed orifice in order to bleed the fluid outlet system.

Still according to the invention, the supply device comprises at least one valve and in particular a valve whose body is arranged, at the level of both ends of the through channel, in an identical fashion, for accommodating and fixing either various accessories such as connectors, plugs or others, or other valve bodies.

This arrangement of the valve body thus enables to juxtapose, as required, several bodies forming a kind of compact cluster that is easier to install than a multitude of valves in shelters or others, on the border of skiing tracks for example.

According to another arrangement of the invention, the slide valve comprises a bleed channel consisting of an axial bore located at its lower section, which channel leads, via a conduit situated on the radial plane of the said slide valve, into the outlet port to perform the said bleeding, which channel is open or closed according to the position of the said slide valve by means of a plug extending axially from the lower end of the body, and that cooperates with the said bleed channel.

According to another arrangement of the invention, the slide valve is guided at its lower end into a socket forming a kind of jacket integral with the valve body, which socket comprises a punched bottom to enable the fluid to flow during the said bleeding, which bottom supports the closing plug of the bleed channel of the said slide valve.

Still according to the invention, the cylindrical bore of the body comprises, between the intake channel and the outlet conduit, a zone provided in the form of a mixer enabling, in co-operation with the section forming the plug of the slide valve, to vary the through opening of the fluid as the slide valve moves from a completely open position with maximum flow rate to a closed position, which stops the circulation of the fluid through the said body.

The valve also has a compact shape forming a true module that can be replaced easily in case of any incident. Thus, according to the invention, the control means of the slide valve consist of a reduction gear located in a cap, itself attached to the top of the body, which cap also contains the control system of the said reduction gear, the limit switches of the said slide valve, the heating control system of the body and, possibly, the water pressure measuring means in the intake channel and in the outlet channel, whereas the systems are gathered on a wafer in the form of an integrated circuit, which wafer also comprises the limit switch system placed opposite to a control finger integral with the said slide valve, and the body comprises a connector and a tight grommet orifice.

According to another arrangement of the invention, the intake and/or through orifices comprise a double cylindrical bore, one of which, situated inwardly, provides the necessary tightness with the associated part or element, and the other, situated at the intake, enables to fasten the latter by means of a transversal keying system, which system comprises keys such as needles, that are diametrically opposite, guided through orifices of the body opening into the intake bore, which needles co-operate with a circular groove provided in the accessory part and in particular on the periphery of a cylindrical section inserted into the intake bore of the valve body.

Still according to the invention, the keys are connected together, forming a kind of U that is fixed to the body by any appropriate means and preferably by a screw serving simultaneously as a blocking member of the accessory part in relation to the valve body.

Still according to the invention, the accessories liable to be associated with the valve body may consist of a junction and assembly socket of two bodies ensuring communication of the supply channel of each of them, or even consist of a plug socket blanking off one of the orifices of the supply channel or still separating two bodies, whereas one of them can be used for water supply while the other is used for air supply of the spray device.

Still according to the invention, the accessories may also consist of connectors for the water and air supply pipes, which connectors would simply be in the form of sockets, T, elbows, etc.

BRIEF DESCRIPTION OF THE DRAWINGS

The invention shall be detailed further using the following description and appended drawings, given for exemplification purposes and on which:

FIG. 4 shows the grouping of the valves together,

FIG. 5 is a partial view of a valve body assembly with an accessory;

FIG. 6 shows the locking means of an accessory on the valve body and the valve body fitted with means for locking a sleeve on the outlet orifice;

FIG. 7 shows the various possibilities to vary the angular position of the valve bodies in relation to one another.

DETAILED DESCRIPTION OF THE INVENTION

Figure 1:
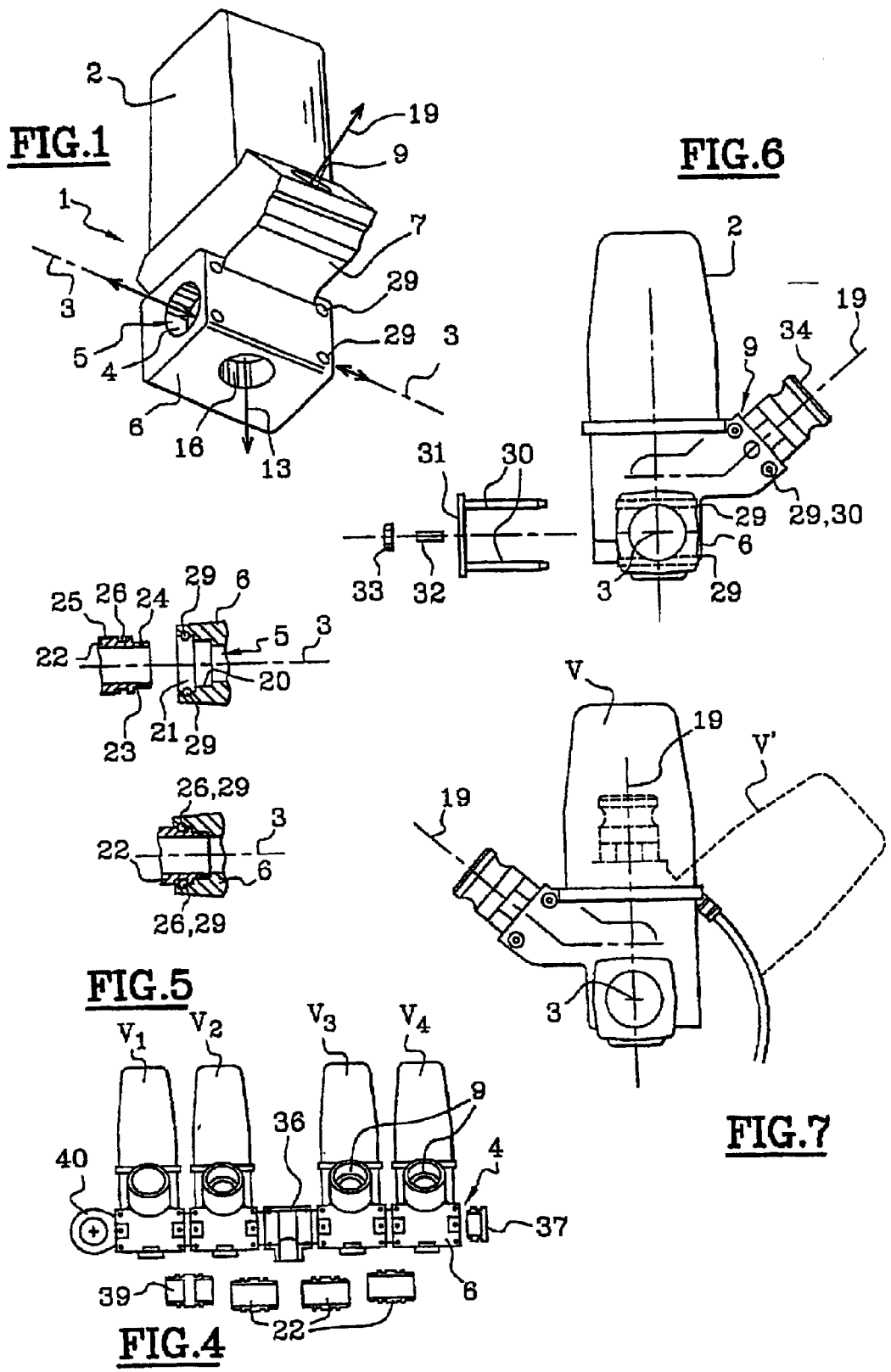
FIG. 1 is a schematic perspective view of a valve of the supply device according to the invention.

The valve represented schematically on FIG. 1 comprises a valve 1 topped with a cap 2. The body 1 is for instance made of a single moulded piece, of right alloy such as aluminium. The cap is made of plastic material, for example, and contains as detailed further, the control gears and the electrical circuits. This cap 2 is assembled and fixed in a tight fashion to the top of the body 1.

The body 1 comprises several orifices and channels. There are, at its lower section, centre on the axis 3, orifices 4 situated on either side of the body at the ends of a channel 5 centred on the axis 3, which channel 5 forms the supply or intake channel.

The orifices 4 are therefore intake, but also through orifices, i.e. enabling to supply a valve body juxtaposed as detailed below.

This intake channel 5 is situated in kind of block 6 in form of a parallelepiped making up the lower section of the body 1. This block 6 is topped with another block 7 oriented perpendicularly, which comprises the outlet orifice 9 and contains an outlet port 10 as shown on FIG. 3.

Through both these blocks 6 and 7 go a transversal bore 12 centred on an axis 13 perpendicular to the axis 3 of the channel 5 of the block 6. This cylindrical bore 12 illustrated on FIGS. 2 and 3, enables to accommodate the slide valve 14 that will be detailed below.

This cylindrical bore 12 extends above the block 7 in a cylindrical section 15 that is accommodated inside the cap 2.

The lower section of the block 6 comprises an orifice 16 that corresponds to the bleed orifices This orifice 16 is situated in the extension of the bore 12, at its lower section.

It can be noted that the outlet orifice 9 situated in the block 7, is centred on an axis 19 describing an angle in the order of 45° with respect to the axis 13, oriented towards the top of the valve. This axis 19 and the outlet duct 19, are centred on a plane perpendicular to the axis 3, going through the axis 13 of the bore 12.

FIG. 1 represents the compactness of the valve and its capacity to form a kind of module that enables as shown on FIG. 4, to create a supply device for a snow gun while gathering several valves V1, V2, V3, V4 in order to form, from a single and unique general water and air supply system, a water and air distribution plant wherein pressures and flow rates can be selected to suit the requirements.

Juxtaposition of the valve bodies is enabled by means of an arrangement of the orifices 4 situated on either side of the block 6 of the valve. These orifices 4 comprise an internal bore 20 at the end of the channel 5 and an external bore 21 close to the end face of the block 6. This arrangement of the orifice 4 enables to accommodate various accessories such as for example a socket 22 as represented partially on FIG. 5. This socket 22, of tubular shape, comprises at one of its ends a cylindrical portion 23 fitted with an O-ring 24 that cooperates with the internal bore 20 provided at the level of the orifice 4, This cylindrical portion 23 is followed by a second cylindrical portion 25 fitted with a groove 26. This second cylindrical portion 25 cooperates with the external bore 21 of the orifice 4.

This bore 21 comprises holes 29, diametrically opposite and parallel to one another, centred on a plane perpendicular to the axis 3. These holes enable the passage of keys 30 that are in the form of needles. The orifices 29 open into the bore 21, enabling to position the needles 30 in the groove 26 provided at the level of the cylinder 25 of the accessory 22, thereby locking this accessory in the orifice 4.

As represented on FIG. 6, the needles 30 are connected together by a small bar 31 that enables to immobilise them in active position by means—of a screw 32 engaging into the body 1, in an appropriate thread and—of a nut 33 clamping the assembly together. The screw 32 may also enable to lock the position of the accessory 22 in order to prevent it from turning inside the orifice 4, round the axis 3.

Still on FIG. 6, the needles 30 are represented facing the holes 29 provided on either side of the orifice 4 in the block 6.

This arrangement of the orifices 6 can be found similarly at the level of the outlet port 9 of the body 1. So, the same needles 30 appear in normal position for locking an accessory 34 consisting of a male connector placed at the level of the outlet port 9 of the body.

FIG. 7 shows lateral views of a valve V represented in full lines and a second valve V' coupled to the former, represented in mixed thin lines and tilted with respect to the form by an angle of 30°. This possibility to vary the angle of the outlet axes 19 of each valve simplifies the connections of the valves with the supply pipes of the snow gun(s).

This possibility of angular variation is however limited by the necessity to keep a gravitational flow in order to bleed the outlet system.

FIG. 4 shows several kinds of accessories that enable to group valves V1, V2, V3, V4 to form a supply device.

Thus, there is a T-shaped accessory 36 situated in the middle of both groups of valves. This accessory 36 enables to feed the different valves and in particular the valves V1, V2 situated on its right on the figure and the valve V3 on its left.

The bodies of the pair of valves V1, V2 are interconnected by means of an accessory 22 in the form of a single socket as illustrated on FIG. 5. At the end, on the valve V2, an accessory 37 in the form of a plug blanking off the orifice 4 of the body 1 can be seen. The valve V2 is supplied via the valve V1.

The valve V1 is fixed to the T 36 using a socket 22 identical to that provided between the valves V1 and V2.

The valve V3 situated on the left of the T 36 on the figure is also fixed to that T 36 by means of a socket 22. The valve V3 is supplied with water also through the T 36.

The valve V4 grouped with the other valves, is used to control the passage of the compressed air.

This valve V4 is fixed to the valve V3 by means of a plug socket 39 that enables to plug one of the orifices 4 of the valve V3 of the valve V4 simultaneously.

This valve V4 Is supplied on its left by means of an accessory 40 in form of an elbow, for example.

Figure 2:
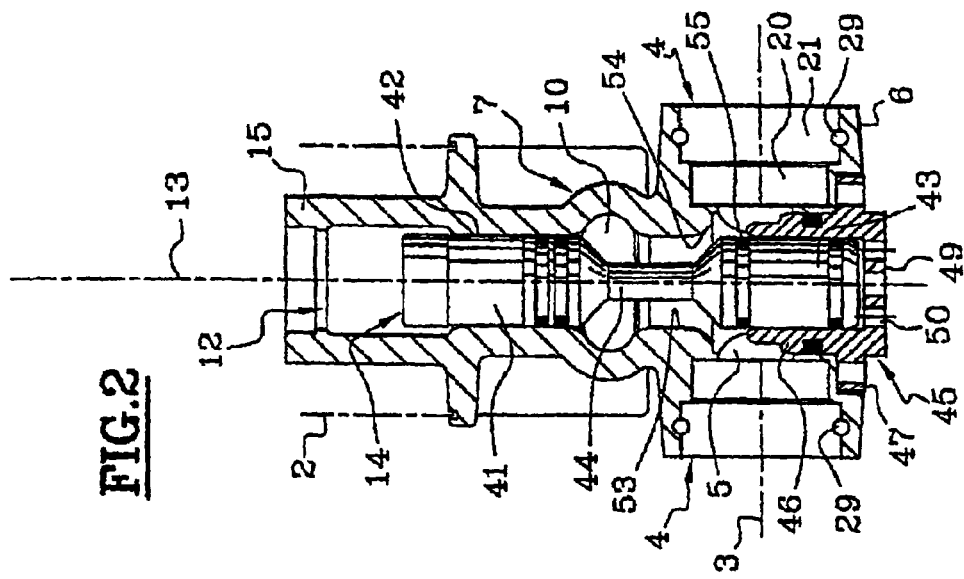
FIG. 2 is a sectional view along a vertical plane through the axis of the supply channel, the valve body and the plug placed in the said body.
Figure 3:
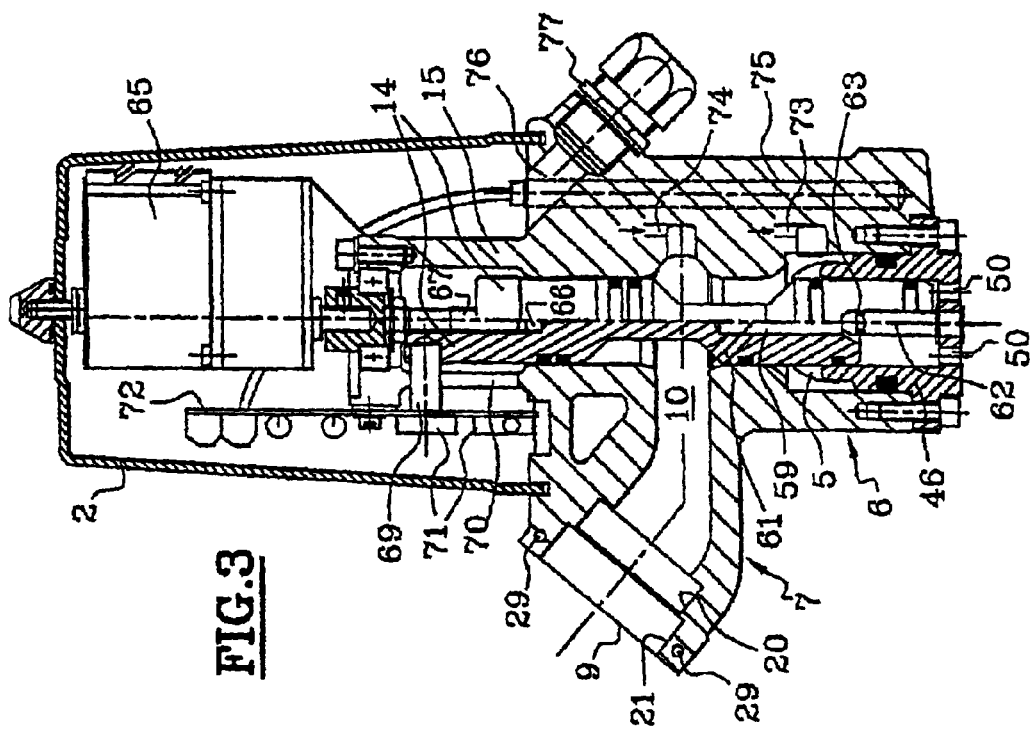
FIG. 3 is a sectional view along a vertical plane through the outlet channel, the valve assembly with the plug, half in completely open position and half in a completely closed position, enabling to bleed the said outlet channel.

FIGS. 2 and 3 show, in a more detailed fashion, the internal essential elements of the valve. The slide valve 14 comprises a cylindrical section 41 guided in the upper section of the body 1 in a hole 42 of the cylindrical bore 12. The lower section of the slide valve 14 has the shape of cylindrical valve 43 connected to the cylindrical section 41 by a rod 44 whose diameter is approximately half that of the cylindrical sections.

Both cylindrical sections 41 and 43 have the same diameter.

The cylindrical section 43 serves as a valve and it is guided in a socket or jacket 45 that positions itself at the level of the bleed orifice 16. This jacket 45 comprises a cylindrical section 46 engaging into the block 6 and even into the channel 6 with a shape enabling water to flow into the said channel 5. A collar 47 enables to attach that jacket 45 to the lower section of the block 6 and the bottom 49 of the said jacket comprises orifices 50 that enable the evacuation of water during the bleeding.

The bleeding will be detailed further in connection with FIG. 3.

The section forming a valve 43 moves inside the body 1 and in particular in the bore 53 situated between the supply channel 5 and the outlet duct 10. The intake 54 of that bore 53 is shaped as a mixer in order to adjust the flow rate between the channel 5 and the outlet port 10. This flow rate is adjusted by moving the slide valve 14 between the open position as represented on FIG. 2 and a closed position in which the upper joint 55 of the valve 43 isolates the supply channel 5 with respect to the outlet port 10.

FIG. 3 shows two halves of the slide valve 14; the right-hand half of the figure is a normal open position as for FIG. 2 while the left-hand half on FIG. 3 is in normal position for blanking off the passage between the intake channel 5 and the outlet port 10.

It can be noted that the valve 43 comprises an internal channel 59 that enables to bleed the outlet system. This channel 59 comprises a bore of the central portion of the valve 43 and an oblique duct 61 that connects the said bore to the outlet port 10. It can be seen that in this closing position of the slide valve, water may flow through the bleed channel 59, and away through the orifices 50 provided in the bottom 49 of the jacket 45.

The bottom 49 comprises a plug 62 extending axially in the bleed channel 59. This plug 62, fitted with an O-ring 63 at it end, blanks off the bleed is channel 59 when the valve 43 is open in a position that enables water or air to flow between the intake channel 5 and the outlet duct 10. Conversely, in normal closing position of the valve, the plug 62 opens the channel 59 and thus enables automatic bleeding of the outlet system.

The slide valve 14 moves under the effect of a control member consisting of a reduction gear 65. This reduction gear 65 is integral with the body 1 and it is in particular flanged to the upper end of the cylinder 15 that extends the said body inside the cap 2. The slide valve 14 comprises an internal bore 66 that is threaded and cooperates with the screw 67 driven by the reduction gear 65.

The slide valve 14 comprises at its upper end, a finger 69 that is guided vertically in a light 70 of the cylinder 15. This finger 69 also enables to trigger limit switches 71. These limit switches are arranged on a wafer 72 provided in the form of an integrated circuit on which are gathered the various components that enable to operate the valve and also to collect the parameters linked to the operation of this valve.

Thus, the valve contains pressure transducers 73 and 74. These pressure transducers are in communication with, on the one hand, the supply channel 5 and on the other hand, the outlet port 10.

The body 1 is also fitted with a heating resistor 75 whose operation is controlled from the mechanism plate 72.

The body 1 comprises an orifice 76 enabling the passage of supply and/or control wires connected to the mechanism plate 72. A connector 77 or a grommet enables to connect the valve to a general control panel that supervises the operation of the snow gun(s).

What is claimed is:

1. A supply device for a snow gun comprising at least one valve for circulating either pressurized water or pressurized air, which valve contains, in a single piece body:
   a through channel forming a fluid intake and also serving as a through passage for fluid;
   a fluid outlet port situated above the through channel;
   a bleed orifice located beneath the through channel;
   a cylindrical bore arranged according to an axis perpendicular to a longitudinal axis of the through channel and including a slide valve therein; said slide valve being mobile under the effect of a control member between a first position in which the through channel is placed in communication with the outlet port, and a second position in which the outlet port is placed in communication with the bleed orifice.

2. The supply device for a snow gun according to claim 1, wherein said body is arranged at the level of both ends of the through channel, in an identical fashion.

3. The supply device for a snow gun according to claim 1, wherein the slide valve comprises a bleed channel consisting of an axial bore located at its lower section, leading via a conduit into an outlet duct of the outlet port to perform the bleeding; said bleed channel adapted to be open or closed according to the position of the slide valve via a plug extending axially from a lower end of the body.

4. The supply device for a snow gun according to claim 3, wherein the slide valve is guided at its lower end into a jacket integral with the body; said jacket comprising a punched bottom for enabling fluid to flow during the bleeding; said bottom supporting the plug which closes the bleed channel when the slide valve is in said first position.

5. The supply device for a snow gun according to claim 3, wherein the cylindrical bore of the body between the through channel and the outlet duct of the outlet port comprises an intake zone shaped as a mixer enabling, in cooperation with a cylindrical section forming the plug of the slide valve, to vary the fluid flow rate as the slide valve moves between a completely open position and its closed position.

6. The supply device for a snow gun according to claim 3, wherein the control member comprises a reduction gear located in a cap that is attached to the top of the body in a tight fashion; said cap containing a mechanism plate on which are gathered in the form of an integrated circuit, various control systems of the reduction gear, circuits associated with limit switches triggered by a finger attached to an upper end of the slide valve, a control circuit of a resistor serving to reheat the body to prevent frost problems, and water pressure measuring circuits in the through channel and in the outlet duct, whereas the body is fitted with a connector or a tight grommet orifice.

7. The supply device for a snow gun according to claim 1, further comprising intake orifices of the through channel which comprise a double cylindrical bore, including an internal bore and an external bore, and fastening means for accessories associated with the body; said fastening means comprising keys in the form of needles adapted to be placed in diametrically opposite holes opening into the external bore and to cooperate with a groove provided on a corresponding cylindrical section of an accessory.

8. The supply device for a snow gun according to claim 7, wherein the keys are interconnected together, and form a U that can be secured to the body.

9. The supply device for a snow gun according to claim 7, wherein the accessory has the shape of a plug.

10. The supply device for a snow gun according to claim 7, wherein the accessory has the shape of a tubular socket which enables associating and juxtaposing two valve bodies.

* * * * *